US009893557B2

(12) United States Patent
Filippenko et al.

(10) Patent No.: US 9,893,557 B2
(45) Date of Patent: Feb. 13, 2018

(54) METHOD AND DEVICE FOR FOREIGN OBJECT DETECTION IN INDUCTION ELECTRIC CHARGER

(71) Applicant: SCHNEIDER ELECTRIC USA, INC., Schaumburg, IL (US)

(72) Inventors: Alexander Filippenko, Cary, NC (US); Mark Kocher, Raleigh, NC (US)

(73) Assignee: Schneider Electric USA, Inc., Andover, MA (US)

(*) Notice: Subject to any disclaimer, the term of this patent is extended or adjusted under 35 U.S.C. 154(b) by 110 days.

(21) Appl. No.: 14/904,209

(22) PCT Filed: Jul. 12, 2013

(86) PCT No.: PCT/US2013/050231
§ 371 (c)(1),
(2) Date: Jan. 11, 2016

(87) PCT Pub. No.: WO2015/005935
PCT Pub. Date: Jan. 15, 2015

(65) Prior Publication Data
US 2016/0172891 A1 Jun. 16, 2016

(51) Int. Cl.
H01M 10/44 (2006.01)
H01M 10/46 (2006.01)
(Continued)

(52) U.S. Cl.
CPC ............ H02J 7/025 (2013.01); H02J 7/042 (2013.01); H02J 17/00 (2013.01); H02J 50/60 (2016.02)

(58) Field of Classification Search
CPC .... H02J 5/00; H02J 7/355; H02J 7/025; H02J 7/0042; G01R 1/00; G06F 1/00; G06F 2101/00
(Continued)

(56) References Cited

U.S. PATENT DOCUMENTS 4,926,226 A 5/1990 Heremans et al.
5,351,005 A 9/1994 Rouse et al.
(Continued)

FOREIGN PATENT DOCUMENTS

EP 2317625 5/2011
GB 2471879 1/2011
(Continued)

OTHER PUBLICATIONS

International Search Report and Written Opinion for PCT/US2013/050231, dated Dec. 23, 2013, 15 pp.

Primary Examiner — Edward Tso
(74) Attorney, Agent, or Firm — Locke Lord LLP

(57) ABSTRACT

An example embodiment of the invention is a method and device for detecting foreign objects (FO) near the primary coil of an induction charger used in charging electric vehicle batteries. Individual sensors of a sensor array are configured to output a sensing signal in response to magnetically coupling the high frequency alternating magnetic field produced by the primary coil. A disable signal line is configured to disable the power source when a controller determines from scanned sensor signals, that a FO is present. An alarm can be activated by the microprocessor to alert the user to the presence of a FO on or near the primary coil. In this manner, damage can be avoided that could otherwise be caused from the presence of a FO near the primary coil. Moreover, a more efficient charging operation can be achieved by avoiding dissipating energy by heating a FO.

19 Claims, 7 Drawing Sheets

(51) Int. Cl.
*H02J 7/02* (2016.01)
*H02J 17/00* (2006.01)
*H02J 50/60* (2016.01)
*H02J 7/04* (2006.01)

(58) Field of Classification Search
USPC ....... 320/107, 108, 114; 324/207.13, 207.14, 324/207.15, 207.17
See application file for complete search history.

(56) References Cited

U.S. PATENT DOCUMENTS

| | | | |
|---|---|---|---|
| 5,573,090 A | 11/1996 | Ross | |
| 5,821,731 A | 10/1998 | Kuki | |
| 7,443,135 B2 | 10/2008 | Cho | |
| 8,307,967 B2 | 11/2012 | Patwardhan | |
| 8,360,216 B2 | 1/2013 | Meins et al. | |
| 2005/0178632 A1 | 8/2005 | Ross | |
| 2010/0181126 A1 | 7/2010 | Penrod | |
| 2010/0213934 A1* | 8/2010 | Wang | B82Y 25/00 324/252 |
| 2010/0219796 A1 | 9/2010 | Kallmyer | |
| 2010/0219823 A1* | 9/2010 | Gogolla | G01V 3/10 324/258 |
| 2010/0225271 A1 | 9/2010 | Oyobe et al. | |
| 2011/0128015 A1 | 6/2011 | Dorairaj et al. | |
| 2011/0169488 A1 | 7/2011 | Mather | |
| 2012/0038317 A1 | 2/2012 | Miyamoto et al. | |
| 2012/0077537 A1 | 3/2012 | Muratov et al. | |
| 2012/0119699 A1 | 5/2012 | Carbunaru et al. | |
| 2012/0236903 A1 | 9/2012 | Rejman et al. | |
| 2012/0265381 A1 | 10/2012 | Lee | |
| 2012/0274314 A1 | 11/2012 | Cesaretti et al. | |
| 2012/0280655 A1 | 11/2012 | Schneider et al. | |
| 2012/0293116 A1 | 11/2012 | Tate, Jr. et al. | |
| 2013/0029595 A1 | 1/2013 | Widmer et al. | |
| 2013/0033227 A1 | 2/2013 | Gibbons, Jr. | |
| 2013/0038276 A1 | 2/2013 | Raedy | |
| 2013/0049683 A1 | 2/2013 | Farkas | |
| 2013/0069441 A1 | 3/2013 | Verghese et al. | |
| 2013/0169062 A1 | 7/2013 | Maikawa et al. | |
| 2013/0193749 A1 | 8/2013 | Nakamura et al. | |
| 2014/0091757 A1 | 4/2014 | Proebstle et al. | |
| 2014/0232200 A1 | 8/2014 | Maekawa | |
| 2014/0292266 A1 | 10/2014 | Eger et al. | |
| 2014/0300351 A1* | 10/2014 | Hahl | G01V 3/107 324/259 |
| 2014/0340035 A1 | 11/2014 | Maekawa | |
| 2015/0091507 A1 | 4/2015 | Hyde et al. | |
| 2015/0200550 A1 | 7/2015 | Maekawa | |
| 2015/0224882 A1 | 8/2015 | Brill et al. | |
| 2015/0233988 A1* | 8/2015 | Katz et al. | G01R 27/2809 |
| 2016/0282500 A1* | 9/2016 | Filippenko | G01V 3/104 |

FOREIGN PATENT DOCUMENTS

| | | |
|---|---|---|
| WO | WO2012084095 | 6/2012 |
| WO | 2013/103948 A2 | 7/2013 |
| WO | WO2014029439 | 2/2014 |
| WO | WO2015067816 | 5/2015 |
| WO | WO2015128450 | 9/2015 |

\* cited by examiner

METHOD AND DEVICE FOR FOREIGN OBJECT DETECTION IN INDUCTION ELECTRIC CHARGER

FIELD OF THE INVENTION

The invention is generally directed to the detection of foreign objects on the main charging coil of an electric induction charger used in charging electric vehicle batteries.

BACKGROUND OF THE INVENTION

With the increasing popularity of electric vehicles, wireless or contactless induction charging is becoming of interest. In an induction charging system, a primary coil operating at a high frequency, creates an alternating magnetic field that couples a secondary coil, which produces an alternating current that can be subsequently used by on-board electronics of the electric vehicle to charge its batteries. Power is delivered from the primary coil to the secondary coil over a relatively large air gap via the magnetic coupling. The charger can operate at a high frequency (typically from 30 kHz to 140 kHz) to deliver the required power with moderate sized equipment. Resonant circuits are normally used in the primary and secondary coils to enhance power transfer, while minimizing the required voltage and current from the power supply to the primary coil.

In an example magnetic coupling structure, the primary and secondary coils may have substantially the same dimensions. In electric vehicle charging, the secondary coil can be attached to the underside of the electric vehicle, while the primary coil can lie flat on the floor of a garage, for example, or it can be buried beneath pavement in a parking lot or in the ground. When the electric vehicle has stopped and positions its secondary coil over the primary coil, the primary and secondary coils occupy substantially parallel planes separated by an air gap of, for example, a few centimeters. Electric power can then be transferred across the air gap via the magnetic coupling from the primary coil to the secondary coil on the vehicle.

SUMMARY OF THE INVENTION

The significant air gap between the primary and secondary coils of and electric vehicle induction charger permits the accidental introduction of a foreign object (FO) between the two coils that can cause significant damage to the charging system and/or the electric vehicle. Metallic foreign object lying between the primary and secondary coils will be exposed to the electromagnetic field, resulting in heating of the foreign object and a reduced magnetic field in the area around the foreign object. An example embodiment of the invention is a method and device for detecting foreign objects near the primary coil of an induction charger. A sensor array is located adjacent to the primary coil, such that the array covers at least a portion of the primary coil area. The sensors are configured to output a sensing signal in response to magnetically coupling the high frequency alternating magnetic field strength produced by the primary coil. A controller is coupled to each respective row of sensors and each respective column of sensors. The controller is configured to scan the sensing signals of the respective sensors in the array. Based on the scanned sensor signals, the controller determines whether there is a sensor in the array that is outputting a sensing signal indicating the presence of a foreign object proximate to the sensor, which is perturbing the high frequency alternating magnetic field strength near the sensor.

A disable signal line may be coupled from the controller to a control input of a power source of the primary coil. The controller is configured to disable the power source via the disable signal line when the controller determines from the scanned sensor signals, that a foreign object is present.

In this manner, damage can be avoided that could otherwise be caused by the presence of a foreign object near the primary coil. Moreover, a more efficient charging operation may be achieved by avoiding dissipating energy by heating a foreign object.

BRIEF DESCRIPTION OF THE DRAWINGS

Example embodiments of the invention are depicted in the accompanying drawings that are briefly described as follows.

DETAILED DESCRIPTION OF THE EXAMPLE EMBODIMENTS

Figure 1A:
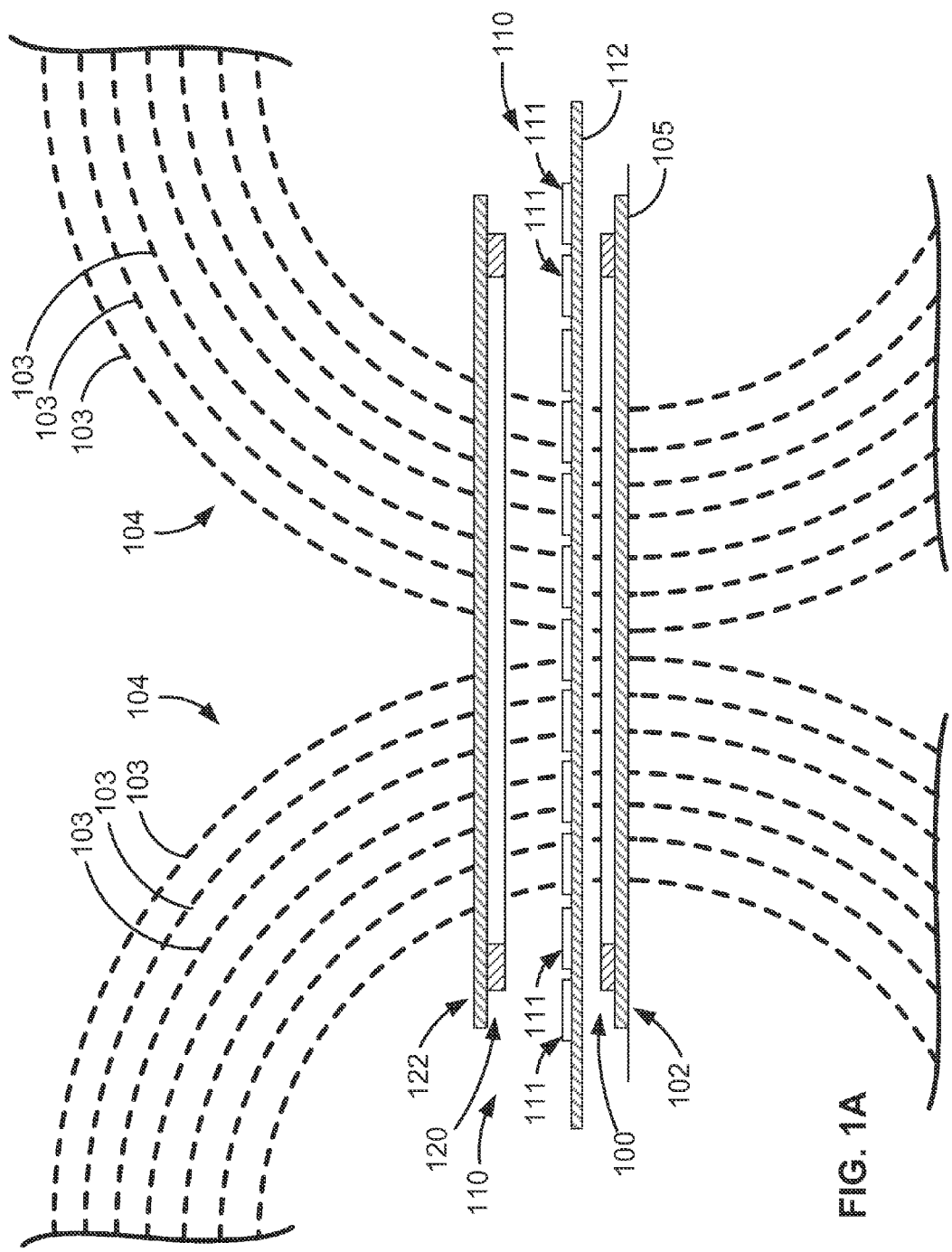
FIG. 1A illustrates an example embodiment of a device for detecting foreign objects in the vicinity of the primary coil of an induction battery charger, which magnetically couples with a secondary coil mounted on an electric vehicle for charging the battery of the electric vehicle. The figure is a cross sectional view along the section line 1A-1A' of FIG. 2A, showing an array of sensors located above the primary coil, for detecting the presence of a foreign object (FO) that can distort the magnetic field, in accordance with an example embodiment of the invention.

FIG. 1A illustrates an example embodiment of a device for detecting foreign objects in the vicinity of the primary coil 100 of an induction battery charger located, for example, on the floor 105 of a garage. The figure shows magnetic field lines 103 representing the magnetic field 104 produced by the primary coil 100, which couple the secondary coil 120 mounted on an electric vehicle for charging the battery of the electric vehicle. The magnetic field lines 103 are parallel to the direction of the magnetic field 104 in the space surrounding the primary coil 100. The local density of the field lines 103 is proportional to the magnitude of the magnetic field 104. The figure shows the sensor array 110 comprised of individual sensors 111 mounted on a printed circuit board or other suitable surface 112 capable of supporting the sensors 111 and their associated connectors that can be located above the primary coil 100, for detecting the presence of a foreign object (FO) that would distort the magnetic field 104, in accordance with an example embodiment of the invention. For the purpose of describing the present invention the word "array" is defined as the placement of individual sensors 111 on the surface 112, which is not necessarily a geometric pattern. The sensor mounting surface 112 may lie substantially in a single plane, or not. For ease in describing the invention the "array" is shown in a commonly recognized rectangular configuration.

The primary coil 100 can be any suitable configuration such as printed coil, multilayer coils, wired coils, and the like, which could be mounted on a suitable surface such as a printed circuit board 102. In alternate embodiments, the printed circuit board 102 can be omitted and the primary coil 100 can be incorporated into the body of the floor 105 or underlying pavement or it can be glued to a plastic substrate forming a charging plate or paddle.

The relatively large area of the primary coil 100 produces a high frequency, alternating magnetic field 104 shown in FIG. 1A. The current carrying wires of the primary coil 100 generate the magnetic field 104 represented by magnetic field lines 103 that form concentric circles around the wire of the primary coil 100. The magnetic field 104 forms a closed loop, but the path of the loop depends on the conductive and magnetic properties of the surrounding materials. The number of sensors 111 in the sensor array 110 shown in FIG. 1A and their relative size when compared with the size of the primary coil 100, is merely an example embodiment of the invention and other numbers and relative sizes can be employed.

Figure 1B:
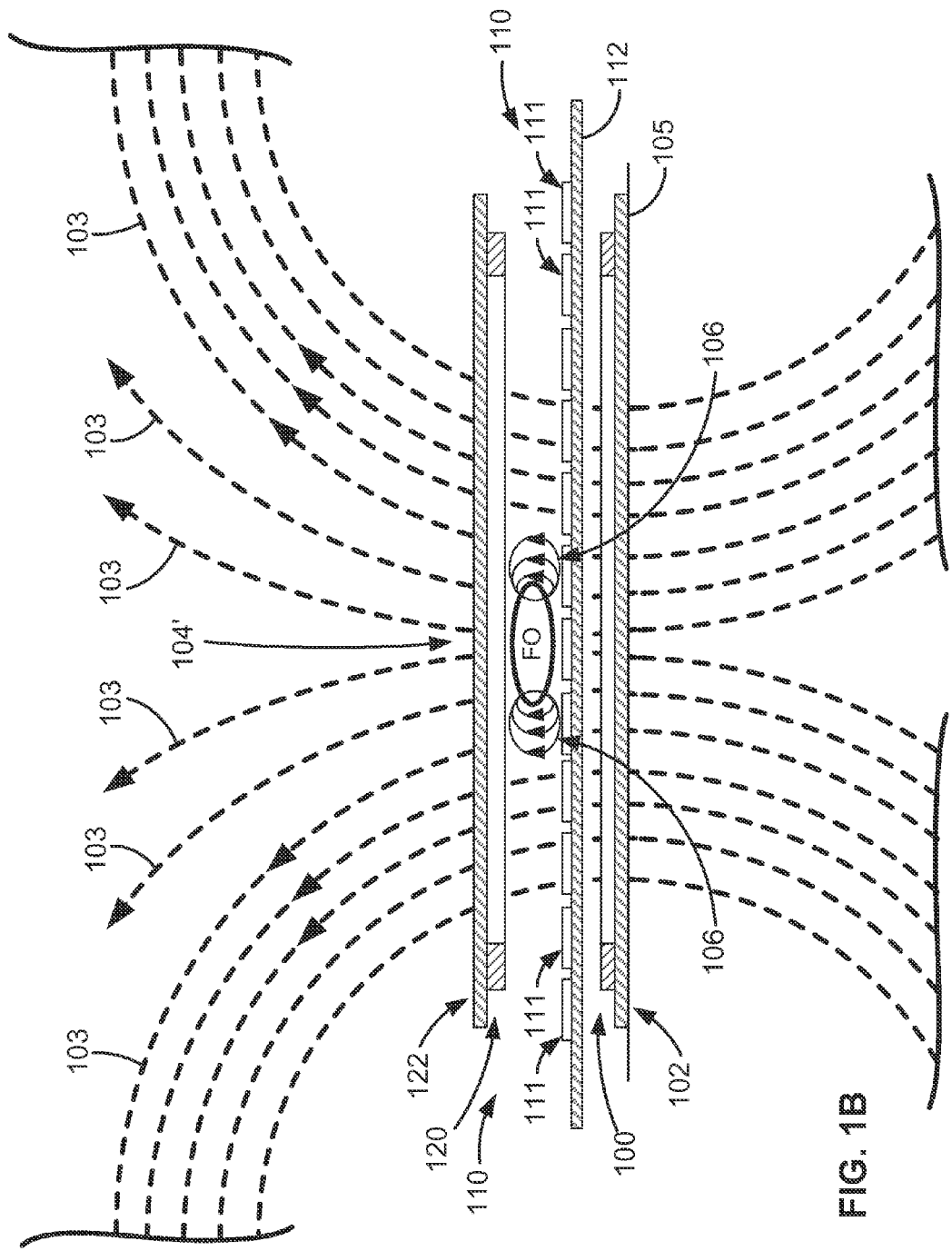
FIG. 1B illustrates the example embodiment of the device shown in FIG. 1A, where the magnetic field is distorted by the presence of a foreign object FO positioned above the primary coil. The figure shows the array of sensors located above the primary coil, with the particular sensor located beneath the foreign object, detecting the presence of the foreign object (FO) from its distortion of the magnetic field, in accordance with an example embodiment of the invention.

FIG. 1B illustrates the example embodiment of the device shown in FIG. 1A, where the magnetic field 104' is a distorted version of the magnetic field 104, altered by the presence of a foreign object FO positioned above the primary coil 100. The figure shows the array of sensors 110 mounted on the printed circuit board/surface 112 located above the primary coil 100, detecting the presence of the foreign object (FO) from the distorted magnetic field 104', in accordance with an example embodiment of the invention.

In the case of a conducting foreign object FO, such as a metal or semiconductor, Eddy currents will circulate inside the body of the foreign object FO when it is exposed to the high frequency, alternating magnetic field 104 from the primary coil 100. The induced Eddy currents react against the magnetic field strength 104 from the primary coil 100 and create their own magnetic dipole field 106. The location of the foreign object FO above the primary coil 100, causes the direction of the magnetic dipole field 106 in the area directly beneath the foreign object, to be opposite to the direction of the magnetic field 104 from the primary coil 100. The resultant magnetic field 104' is the vector sum of these two oppositely directed magnetic fields, 104 and 106, whose magnitude is reduced from that for the magnetic field 104, in the region directly beneath the foreign object FO.

In accordance with an example embodiment of the invention, the particular sensor 111 of the sensor array 110 of FIG. 1B, which is located directly beneath the foreign object FO, can detect the presence of the foreign object by sensing the reduced magnetic field 104' in the region directly below the foreign object FO.

In the case of a highly conductive foreign object FO, the total magnetic field 104' produced by the primary coil 100 in the area directly beneath the foreign object FO can be approximately equal to zero, since the magnetic dipole field 106 created by the Eddy currents can be approximately equal to the magnetic field 104 created by the primary coil 100, but oppositely directed. FIG. 1B shows the array of sensors 110 mounted on the printed circuit board/surface 112 located above the primary coil 100. The particular sensor 111 in the sensor array 110 located directly beneath the foreign object FO, can detect the presence of the foreign object from its distortion of the magnetic field 104', in accordance with an example embodiment of the invention.

Figure 2A:
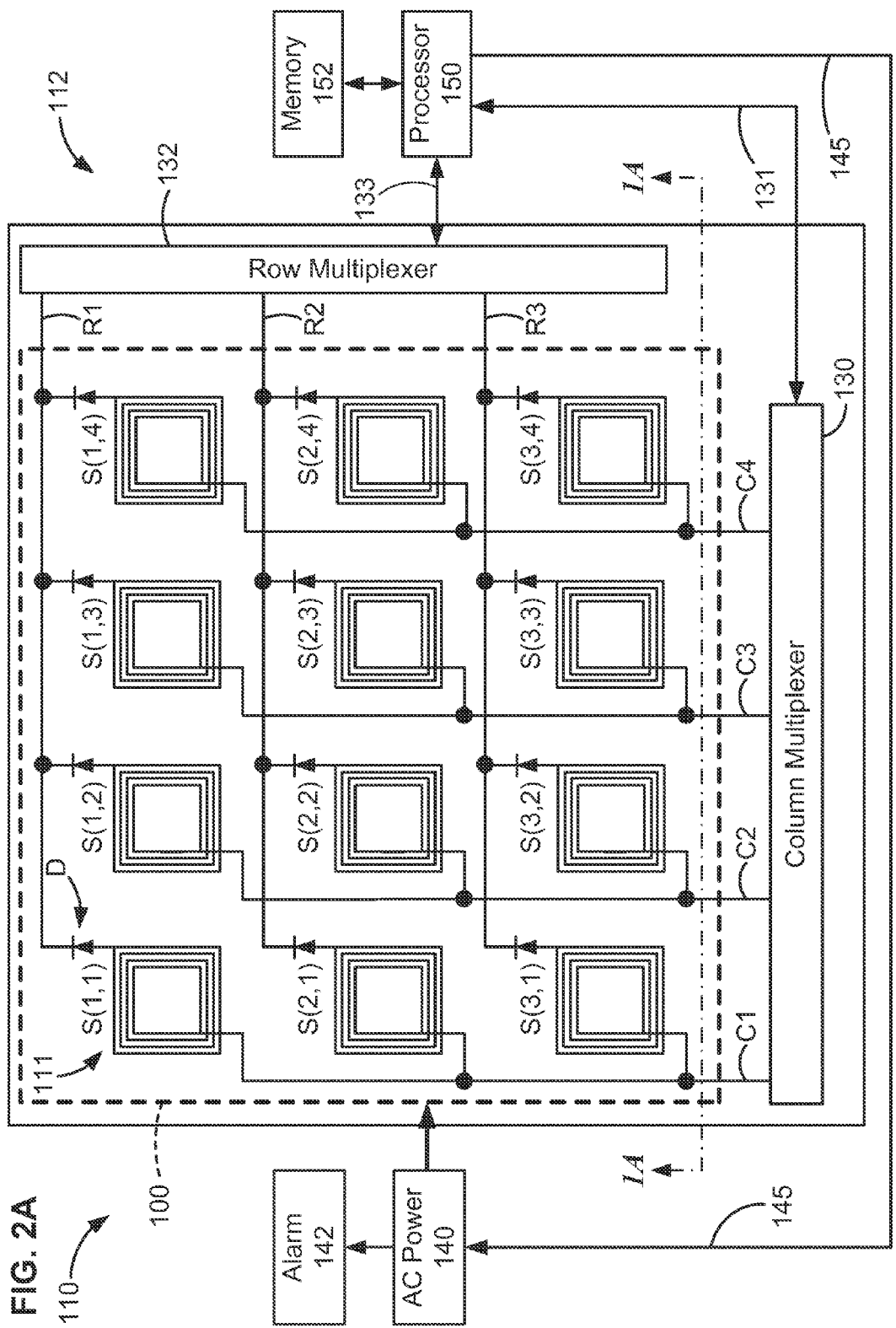
FIG. 2A illustrates an example embodiment of the device shown in FIGS. 1A and 1B, showing an example layout of sensors in the sensor array located above the primary coil, in accordance with an example embodiment of the invention.

FIG. 2A illustrates the example embodiment of the device shown in FIGS. 1A and 1B, showing an example layout of sensors 111 in the sensor array 110 located above the primary coil 100, in accordance with an example embodiment of the invention. In the following description of the invention, the sensors 111 in the sensor array 110 are designated as S(row, column) or S(R,C), in matrix notation. The sensors S(R,C) are arranged in three rows, the rows labeled R1, R2, and R3. Each row of sensors S(R,C) contains four sensors S(R,C) arranged in respective columns labeled C1, C2, C3, and C4. For example, the sensor S(R,C) located in the row R2 and column C3 is designated as S(2,3). The number of sensors S(R,C) in the sensor array 110 shown in FIG. 2A and their relative size when compared with the size of the primary coil 100, is merely an example embodiment of the invention and other numbers and relative sizes can be employed. The array may preferably cover most of the primary coil 100 surface, for example as illustrated in FIG. 2A.

In an example embodiment of the invention, each respective row of sensors S(R,C) is connected to the row multiplexer 132 and each respective column of sensors S(R,C) is connected to the column multiplexer 130. The multiplexers 130 and 132 are connected to the microprocessor 150 and its memory 152. The high frequency power driver 140 supplies the high frequency alternating current to the primary coil 100, for example from 30 kHz to 140 kHz, to create the magnetic field 104 that is sensed by the sensors S(R,C) of the sensor array 110.

In an example embodiment of the invention, each sensor S(R,C) of the sensor array 110, can be a coil 115 (FIG. 2B) constructed of a number of turns of thin conductors, for example printed circuit coils on the printed circuit board/surface 112 or as a flexible circuit. Each sensor S(R,C) can include a small rectifying diode D to produce a DC voltage whose magnitude depends on the magnitude of the total magnetic field 104' that it couples. The diode D for each sensor S(R,C) enables providing a DC sensor signal from each sensor S(R,C) in a selectable matrix arrangement of rows R1, R2, R3 and columns C1, C2, C3, and C4. The diodes D can be arranged with their cathodes respectively connected to the row lines R1, R2, R3 and their anodes respectively connected through the sensor S(R,CC) to the column lines C1, C2, C3, and C4, as shown in FIG. 2A. In an example embodiment of the invention, the diodes D can also assist in electrically isolating non-selected sensors S(R,C).

In an example embodiment of the invention, the figure shows an example alarm and/or disable signal line 145 connected from the microprocessor 150 to a control input of the high frequency power driver 140. The microprocessor 150 can determine from the measured values of the sensor signals that it scans from the sensor array 110, that there is a local variation in a measured sensor signal indicating the presence of a foreign object FO. The microprocessor 150 may then output an alarm and/or disable signal on line 145 to set an alarm 142 and/or disable the high frequency power driver 140. The alarm 142 may be activated by the microprocessor 150 to alert the user to the presence of a foreign object FO on or near the primary coil 100.

Figure 2B:
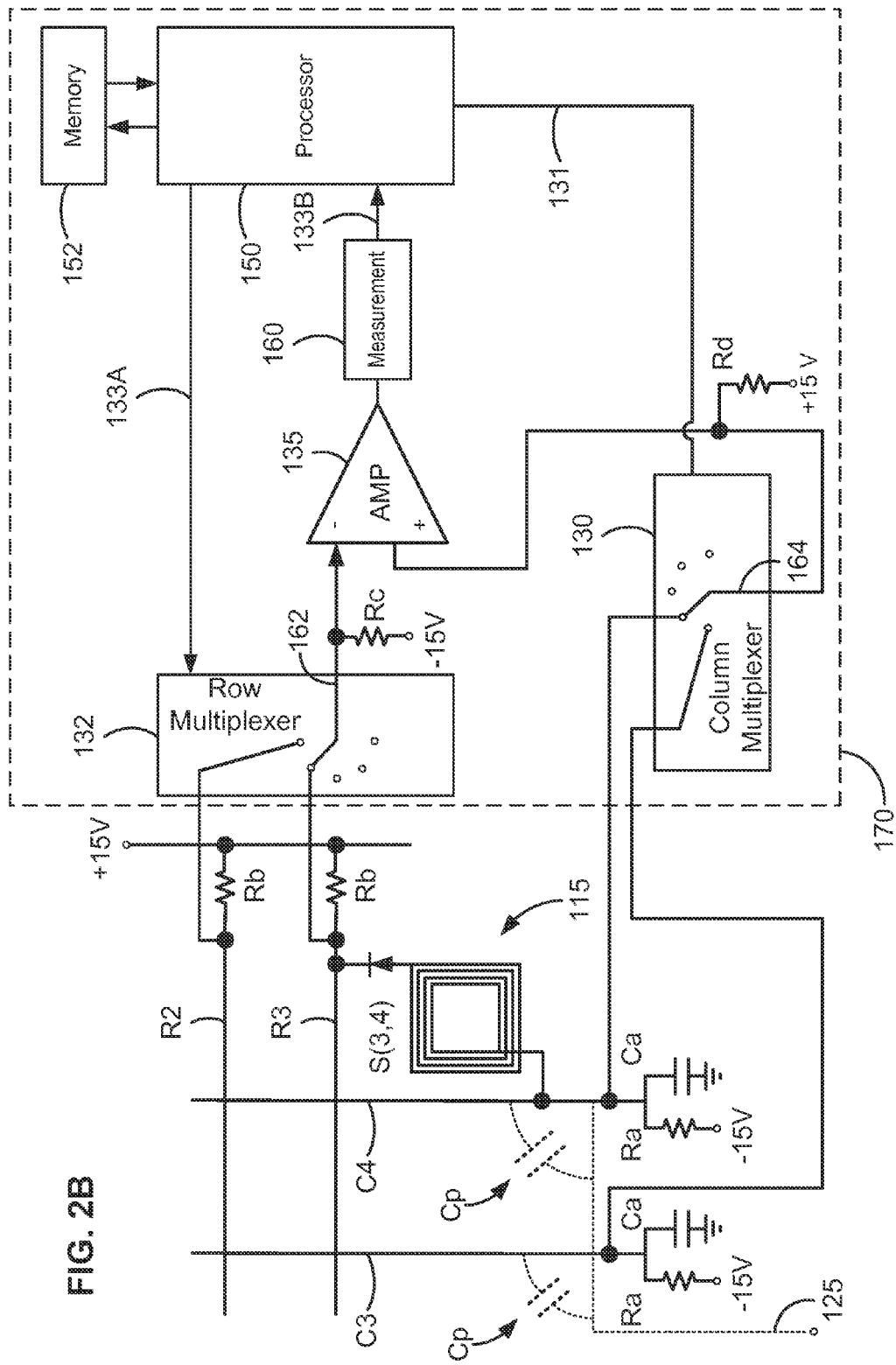
FIG. 2B illustrates an example embodiment of the device shown in FIG. 2A, showing an example controller for scanning the sensors in the sensor array and measuring the sensor signal from a selected sensor, in accordance with an example embodiment of the invention.

FIG. 2B illustrates an example embodiment of the device shown in FIG. 2A, showing an example controller 170 for scanning the sensor S(R,C) in the sensor array 110 and measuring the sensor signal from a selected sensor S(R,C), in accordance with an example embodiment of the invention. The example controller 170 can comprise the microprocessor 150, memory 152, column multiplexer 130, row multiplexer 132, differential amplifier 135, and sensor signal measurement unit 160. The column multiplexer 130 includes a gate 164 to select each respective column line C1, C2, C3, and C4, with the gate 164 shown in the figure connected to the column line C4. When the microprocessor 150 selects the column line C4, for example, it sends an enabling signal on scanning line 131 to enable the gate 164 to connect the column line C4 to the negative terminal of the differential amplifier 135.

The row multiplexer 132 includes a gate 162 to select each respective row line R1, R2, R3, with the gate 162 shown in the figure connected to the row line R3. When the microprocessor 150 selects the row line R3, for example, it sends an enabling signal on scanning line 133A to enable the gate 162 to connect the row line R3 to the positive terminal of the differential amplifier 135.

The sensor signal from the sensor S(3,4) selected by the multiplexers 130 and 132, is applied to the inputs of the differential amplifier 135. The differential amplifier 135 outputs a difference sensor signal derived from the sensor signal and related to the magnitude of the alternating magnetic field 104 sensed by the sensor S(3,4) at its location, which is measured by the measurement unit 160. The measured digital value of the difference sensor signal is sent over line 133B to the microprocessor 150. The microprocessor 150 can compare the measured value of the difference sensor signal for the sensor S(3,4) with reference values for the sensor S(3,4) stored in the memory 152 to determine whether there is a local variation in the measured difference sensor signal, indicating the presence of a foreign object FO.

In accordance with an example embodiment of the invention, the device shown in FIG. 2B increases the sensitivity for detecting a foreign object FO on or near the primary coil 100, by reducing the effects produced by electromagnetic interference (EMI) noise 125 coupling non-selected sensor S(R,C) in the array 110. The proximity of the primary coil 100 to the printed circuit conductors forming the row lines, column lines and sensor S(R,C) coils on the printed circuit board/surface 112, creates a parasitic capacitance Cp that can cause electromagnetic interference (EMI) noise 125 to be coupled into these printed circuit structures. The magnitude of the electromagnetic interference (EMI) noise 125 can be as much as 3 kV. The noise 125 can be superimposed on each sensor S(R,C), whether or not it has been selected by the multiplexers 130 and 132. In order to block the noise 125 that is present in the non-selected sensor S(R,C), from reaching the differential amplifier 135, the diode D connected to each respective non-selected sensor S(R,C), is reverse biased by the circuit shown in FIG. 2B. The diode D connected to the selected sensor S(R,C), for example S(3,4), is forward biased by the circuit shown in FIG. 2B. An example parasitic capacitance Cp can be 1 pico-Farad, but other values can materialize, depending on the dimensions of the printed circuit structures, their distance from the primary coil 100, and the dielectric constants of the materials between them.

In accordance with an example embodiment of the invention, when the sensor S(3,4) coil in FIG. 2B is not selected by multiplexers 130 and 132, the diode D is reverse biased by the +15 volt potential applied to its cathode through the 100K-Ohm resistor Rb and the −15 volt potential applied to its anode through the 100K-Ohm resistor Ra and the sensor S(3,4). An example bias capacitor Ca of 0.1 micro-Farads can be connected to ground, in parallel with the resistor Ra. In order to block the noise 125 that is present in the non-selected sensor S(R,C), from reaching the differential amplifier 135, the diode D connected to each respective non-selected sensor S(R,C), is reverse biased by the circuit shown in FIG. 2B. The values of resistors Ra and Rb and bias capacitor Ca are examples and other values can be selected.

In accordance with an example embodiment of the invention, when the sensor S(3,4) in FIG. 2B is selected by multiplexers 130 and 132, the diode D is forward biased by the −15 volt potential applied to its cathode through the 10K-Ohm resistor Rc and the +15 volt potential applied to its anode through the 10K-Ohm resistor Rd and the sensor S(3,4). The values of resistors Rc and Rd are examples and other values can be selected.

The circuit shown in FIG. 2B enables increasing the sensitivity for detecting a foreign object FO on or near the primary coil 100, by reducing the effects produced by electromagnetic interference (EMI) noise 125 coupling non-selected sensor S(R,C) in the array 110.

In an example embodiment of the invention, measurements by the sensor signal measurement unit can be stored in the memory as a pattern of the magnetic field produced by the primary coil and used by the microprocessor as a self-calibration baseline for foreign object detection. In an example embodiment of the invention, pattern of the magnetic field produced by the primary coil is significantly altered by the perturbance in that magnetic field caused by a foreign object near the primary coil of the induction charger. In an example embodiment of the invention, the significantly altered pattern is compared with the stored baseline pattern to determine the presence of a foreign object near the primary coil.

In an example embodiment of the invention, the sensor array 110 can have all wire connections to the multiplexers 130 and 132 configured so as to minimize the area between wires, so that the magnetic field 104 from the primary coil 100 generates a minimum of noise voltage on the wire connections. In an example embodiment, each row line R1, R2, R3 and each column line C1, C2, C3, and C4 can be connected to an individual pair of conductors running closely to each other with twisting where possible, out to the periphery of the primary coil 100. In this manner, the area under a sensor S(R,C) can be significantly higher than the area between the connecting wires, so the signal-to-noise level is kept high. The signal sent by a sensor S(R,C) to the multiplexers 130 and 132 can consist mainly of the signal sensed by the local sensor S(R,C), without any undue contribution by the conductors that are routed through other parts of the sensor array 110.

Figure 3:
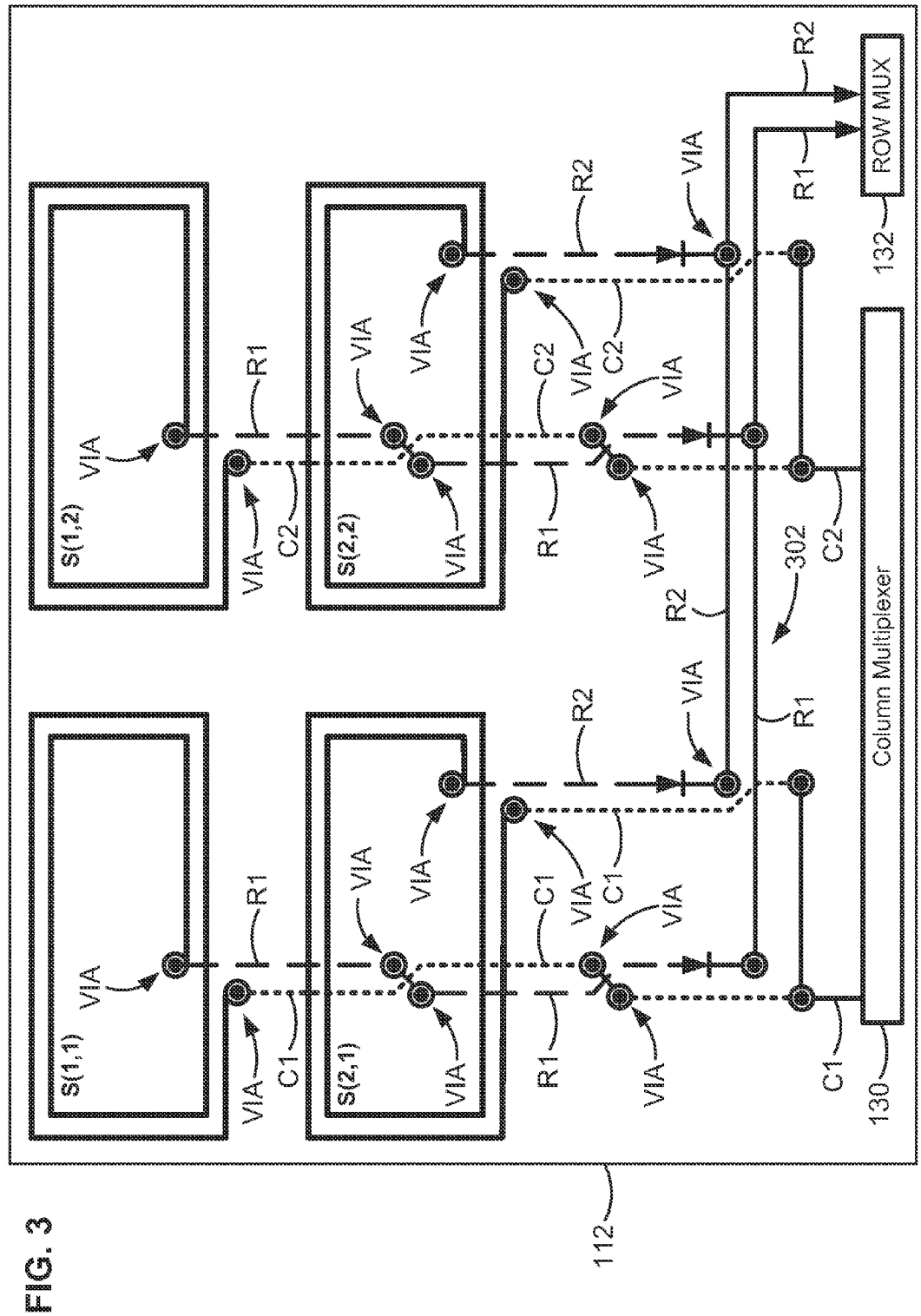
FIG. 3 illustrates an example embodiment of the device shown in FIG. 2A, showing a front side view of the printed circuit board with example "twisted wire" connections to the sensors to minimize noise voltage induced by the magnetic field strength coupling the connections, in accordance with an example embodiment of the invention.

FIG. 3 illustrates an example embodiment of the device shown in FIG. 2A, showing a front view of the printed circuit board/surface 112 with example "twisted wire" connections R3, C3, to the sensor S(3,3) and "twisted wire" connections R3,C4 to the sensor S(3,4) in the sensor array 110 located above the primary coil 100, in accordance with an example embodiment of the invention. The hidden lines indicate conductors located on the back of the printed circuit board/surface 112. Connections between the portions of the conductors located on opposite sides of the printed circuit board/surface 112, are metallic via connections. The sensors S(R,C) formed on the front side of the printed circuit board/surface 112 are printed circuit conductors. The induced sensor signal is conducted over the "twisted wire" connections R3, C3, to the sensor S(3,3) and "twisted wire" connections R3,C4 to the sensor S(3,4) to the column multiplexer 130 and the row multiplexer 132. The "twisted wire" printed circuit connectors minimize noise voltage induced by the magnetic field 104 coupling the connectors. The "twisted wire" connections R3, C3, and the "twisted wire" connections R3,C4 shown in FIG. 3, can also be laid out parallel to a row of coils in an example embodiment of the invention. In an example embodiment of the invention, the horizontal runs 302 of conductors R1 and R2 shown in FIG. 3, can also be laid out as "twisted wire" connections.

In an example embodiment of the invention, a method can be carried out for detecting foreign objects near a primary coil 100 of an induction charger. The steps in the method can include sensing, by each of a plurality of sensors S(R,C) in a sensor array 110 covering at least a portion of the primary coil 100, a high frequency alternating magnetic field 104 produced by the primary coil 100. The method can continue by scanning, by a controller 170 coupled to the sensor array 110, sensor signals output by the plurality of sensors S(R,C) in the sensor array 110, in response to the sensors S(R,C) magnetically coupling the high frequency alternating magnetic field 104 produced by the primary coil 100. The method can continue by determining, by the controller 170 coupled to the sensor array 110, whether there is sensor S(R,C) in the sensor array 110 that is outputting a sensor signal indicating presence of a foreign object FO proximate to the sensor, which is perturbing the high frequency alternating magnetic field 104 near the sensor. The method my further include sending, by the controller 170 coupled to the sensor array 110, a disable signal 145 to a control input of a power source 140 of the primary coil 100, to disable the power source 140 when the controller 170 determines from the scanned sensor signals, that there is a scanned sensor signal indicating presence of a foreign object FO.

In an example embodiment of the invention, the primary coil 100 of an electric vehicle induction charger can generate a magnetic field strength in the range of 0.005 to 0.1 Tesla and a working frequency around 30 kHz. Each sensor S(R,C) can have a size of approximately two to four centimeters and approximately two turns, serving to generate a sensing voltage in range of 3 to 10 volts. This voltage level can be convenient for processing with a modern microcontroller and associated signal conditioning circuitry.

In an example embodiment of the invention, the sensor array 110 can be scanned for variations in local magnetic field 104 with the multiplexers 130 and 132 shown in FIG. 2A. This arrangement enables the selection of one sensor S(R,C) at a time for measuring the magnetic field 104 in the immediate vicinity of that sensor coil or zone. The microprocessor 150 can manage the sequential scanning by each multiplexer, of each of the individual sensor S(R,C) in the array 110. The microprocessor 150 can be programmed to create a map of the field strength measurements across the area of the primary coil 100.

In an example embodiment of the invention, the primary coil 100 can be energized via the charger's high frequency power driver 140, either at full power (with a vehicle and load coil present) or with a lower, pilot-level signal, as might be desired when there is no vehicle present. The sensor array 110 passively senses any perturbations in the magnetic field 104 due to the presence of a foreign object.

In an example embodiment of the invention, in normal operating conditions the sensor array 110 senses a pattern of magnetic field distribution without any sharp changes. Some non-uniformity, however, can be sensed during installation of the system, both with and without a vehicle present, due to variations in local conditions for a specific installation. These measurements can be stored in the memory 152 and used as a baseline for foreign object FO detection during normal operation. The microprocessor 150 can be programmed to set up a self-calibration procedure that can be repeated from time to time, to improve the quality of the operating measurements.

In an example embodiment of the invention, the magnitude of the magnetic field 104 can change macroscopically as a result of normal changes during the charging process, for example due to changing the load position, power regulation, etc. Nevertheless, the overall pattern of the magnetic field 104 should remain the same, unless a foreign object FO is introduced on the upper surface of the primary coil 100. In this case, the local variation in the magnetic field 104 due to the presence of the foreign object FO, can reduce the magnitude of the magnetic field 104 and the sensor voltage readings from the sensor S(R,C) directly beneath the foreign object FO.

In an example embodiment of the invention, variations in magnetic field 104 can be determined by calculation of the gradients of the voltages across the sensor array 110 and comparing the calculated gradients with baseline measurements previously taken in an original state. A foreign object FO will generate an unusually high gradient in the area surrounding the FO.

In an example embodiment of the invention, variations in magnetic field 104 can be determined by normalization of the sensor array 110 values, so that the average value of the readings of the resulting magnetic field 104 across the sensor array 110 is kept constant for a wide range of operating conditions. In this way, the pattern of sensor voltage readings can stay relatively constant for any level of working power, as long as there is no foreign object FO present. When a foreign object FO is introduced, the resulting variation in the sensor array's detected pattern of magnetic field 104 can be significantly different from the baseline case.

In an example embodiment of the invention, other forms of magnetic field sensors can be used in place of the sensor S(R,C). Examples of sensor technologies that can be usable for detecting magnetic fields in the 0.005 to 0.1 Tesla range are: printed circuit coils, Hall-effect sensors, Microelectromechanical systems (MEMS) sensors incorporating a strain-gauge reading of magnetic force, Giant Magnetoresistive (GMR) sensors, Magneto-optical sensors, magnetotransistors and magnetodiodes. Magnetotransistors and magnetodiodes, lend themselves to a biasing arrangement that can allow individual selection of sensors by rows and columns, simplifying the array scanning process for localization of the foreign object FO.

Figure 4A:
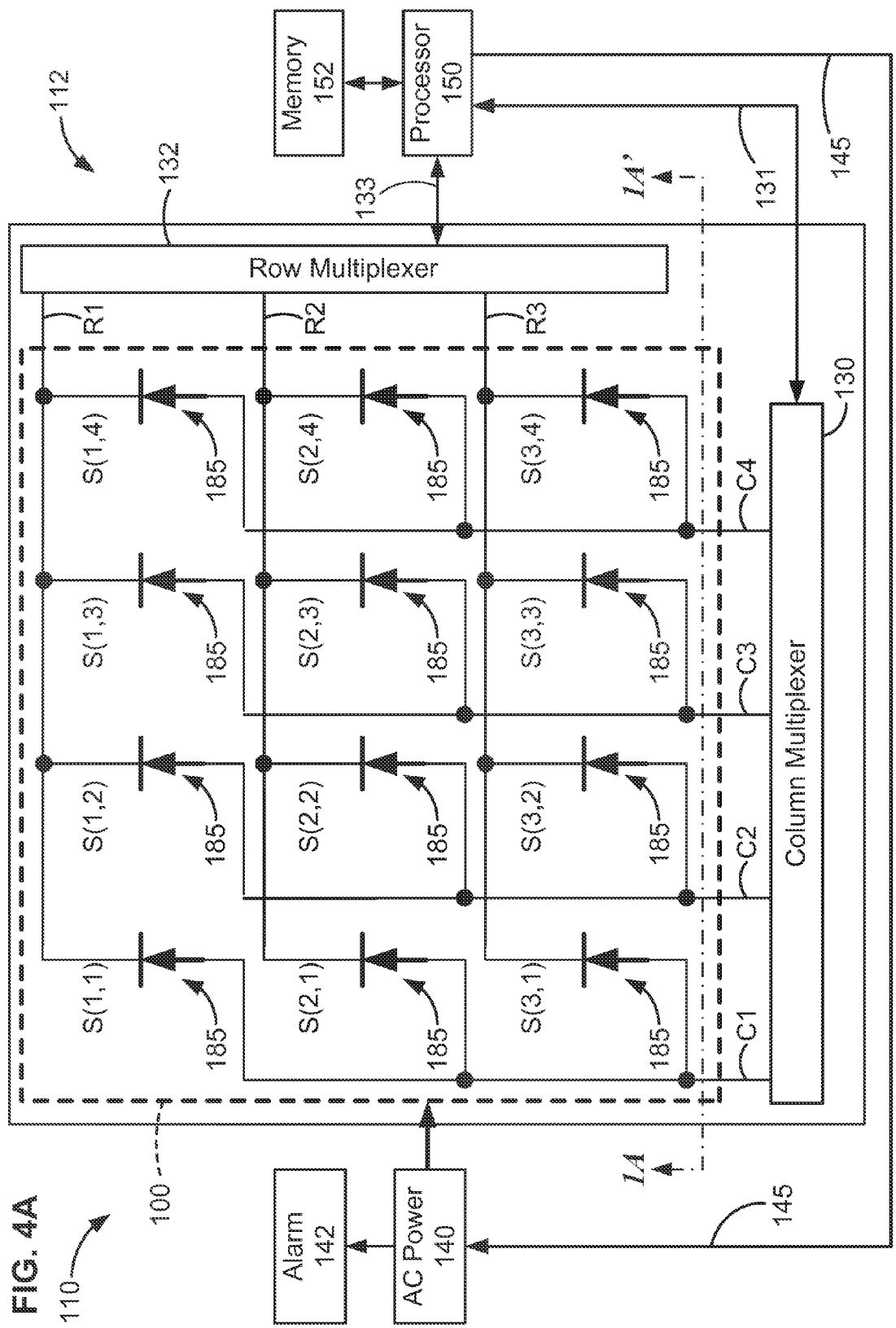
FIG. 4A illustrates an example embodiment of the device shown in FIG. 2A, wherein each sensor S(R,C) can include a circuit that comprises a magnetodiode that can be substituted for each sensor coil S(R,C) in FIG. 2A, in accordance with an example embodiment of the invention.

FIG. 4A illustrates an example embodiment of the device shown in FIG. 2A, wherein each sensor S(R,C) can include a circuit that comprises a magnetodiode 185 that can be substituted for each sensor S(R,C) in FIG. 2A, in accordance with an example embodiment of the invention. The resistance of the magnetodiode semiconductor device 185 changes as a function of applied magnetic field strength, and is not dependent upon the rate at which a magnetic field changes. The magnetic field strength in the vicinity of the sensor is determined by measuring the resistance of the magnetodiode.

In accordance with an example embodiment of the invention, the sensor has a first terminal connected to a row line coupled to the row multiplexer, and a second terminal connected to a column line coupled to the column multiplexer, a diode being connected in series between the sensor and one of the row line or the column line. In accordance with an example embodiment of the invention, the sensor has a first terminal connected to a row line coupled to the row multiplexer, and a second terminal connected to a column line coupled to the column multiplexer, a diode being connected in series between the sensor and one of the row line or the column line, the diode being reverse biased to block coupling to the sensor signal measurement unit when the sensor coil is not selected by the microprocessor, and the diode being forward biased to couple to the sensor signal measurement unit when the sensor coil is selected by the microprocessor. In accordance with an example embodiment of the invention, the sensor is a magnetodiode connected in series with a row line and a column line, the magnetodiode being reverse biased to block coupling to the sensor signal measurement unit when the sensor is not selected by the microprocessor and the magnetodiode being forward biased to couple to the sensor signal measurement unit when the sensor is selected by the microprocessor.

Figure 4B:
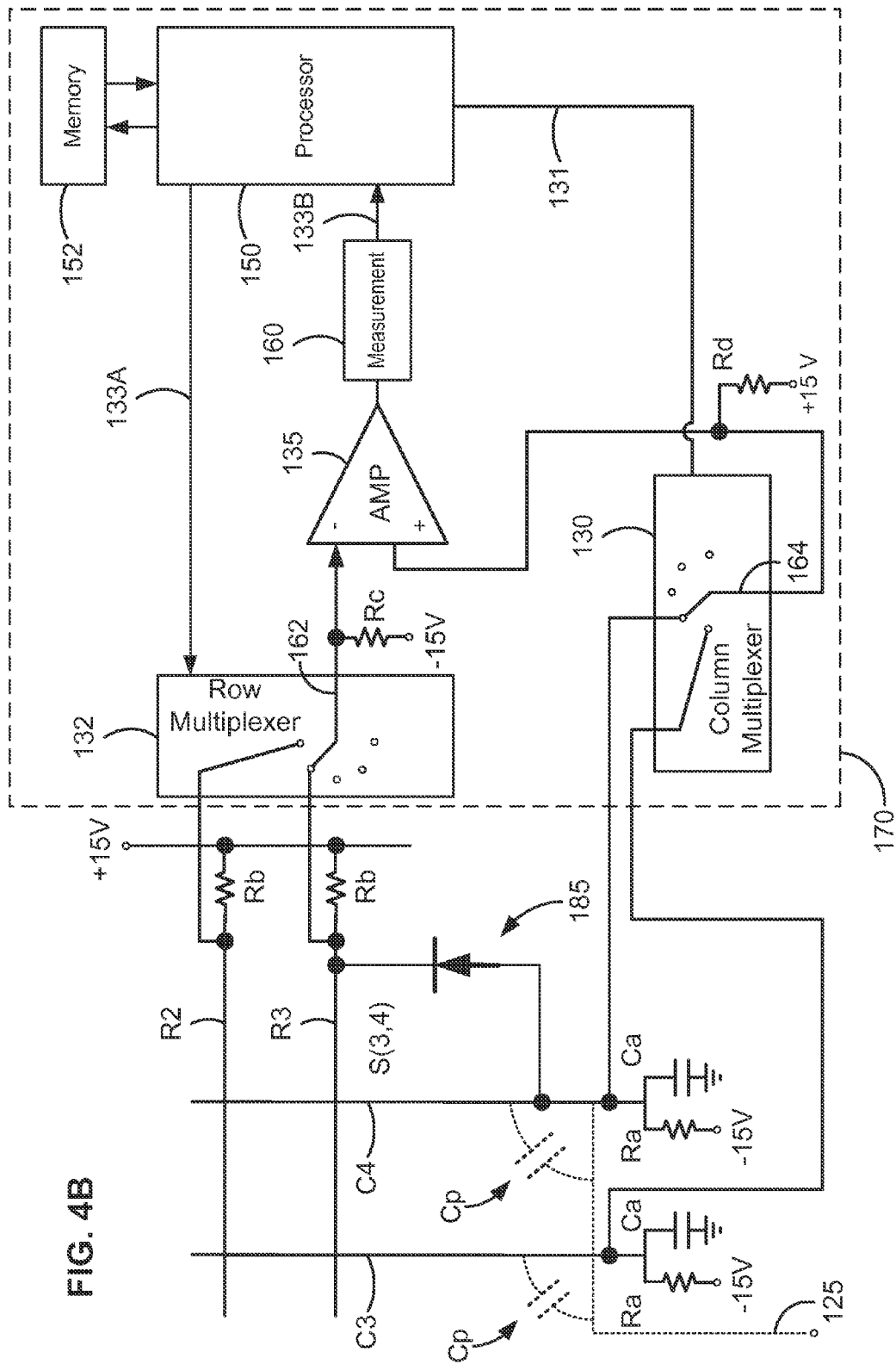
FIG. 4B illustrates an example embodiment of the device shown in FIG. 4A, wherein each sensor S(R,C) can include a circuit that comprises a magnetodiode with a cathode connected to a row line coupled to the row multiplexer, and an anode connected to a column line coupled to the column multiplexer, the magnetodiode being reverse biased to block coupling to the sensor signal measurement unit when the sensor is not selected by the microprocessor and the magnetodiode being forward biased to couple to the sensor signal measurement unit when the sensor is selected by the microprocessor, in accordance with an example embodiment of the invention.

FIG. 4B illustrates an example embodiment of the device shown in FIG. 4A, wherein each sensor S(R,C) can include a circuit that comprises a magnetodiode 185 with a cathode connected to a row line, for example R3, coupled to the row multiplexer 132, and an anode connected to a column line, for example C4, coupled to the column multiplexer 130. The magnetodiode 185 can be reverse biased to block coupling to the sensor signal measurement unit 160 when the sensor S(3,4) is not selected by the microprocessor 150. The magnetodiode 185 can be forward biased to couple to the sensor signal measurement unit 160 when the sensor S(3,4) is selected by the microprocessor 150, in accordance with an example embodiment of the invention. The electromagnetic interference (EMI) noise 125 coupling non-selected magnetodiode sensors 185 in the array 110 of FIG. 4B, can be smaller than that for the secondary coil 115 sensors of FIG. 2B, because the area occupied by the magnetodiode 185 is less than that for a secondary coil 115. An objective is to keep the EMI voltage significantly lower than the blocking voltage on the commutation diodes D on the secondary coils 115 of FIG. 2B, for example 30V. If necessary to further reduce the effects of EMI, capacitors similar to Ca, can be added between the resistor Rb and ground. Values of the additional capacitors can be selected considering the impedance of the magnetodiode. For instance, a capacitance Ca of 1000 pF can reduce the EMI voltage by 300 to 1000 times (for a parasitic Cp=1 to 3 pF), while it can impose an extra load of around 5 kOhm for the magnetodiode 185 sensor working at 30 kHz.

Although specific example embodiments of the invention have been disclosed, persons of skill in the art will appreciate that changes can be made to the details described for the specific example embodiments, without departing from the spirit and the scope of the invention.

What is claimed is:

1. A device for detecting foreign objects near a primary coil of an induction charger, comprising:
    a sensor array arranged in rows of sensors, each row containing sensors arranged in respective columns, the array located adjacent to the primary coil of the induction charger and covering at least a portion of the primary coil, each sensor configured to output a sensing signal in response to magnetically coupling a high frequency alternating magnetic field produced by the primary coil;
    a controller coupled to each respective row of sensors and each respective column of sensors, the controller configured to scan the sensing signal of each sensor in the array and determine from the scanned sensing signals, which sensors in the array are outputting a sensing signal indicating the presence of the foreign object proximate to the sensors, the foreign object causing a perturbance in the high frequency alternating magnetic field near the sensors; and
    means for blocking sensors from coupling to the controller when the sensor is not being scanned by the controller, and coupling the sensor to the controller when the sensor is being scanned by the controller.

2. The device for detecting foreign objects near a primary coil of an induction charger of claim 1, further comprising:
    a disable signal line coupled from the controller to a control input of a power source of the primary coil, configured to disable the power source when the controller determines from the scanned sensor signals, that there is a scanned sensor signal indicating presence of a foreign object.

3. The device for detecting foreign objects near a primary coil of an induction charger of claim 1, wherein the controller comprises:
    a microprocessor for determining when a foreign object has been detected near the primary coil;
    a memory, associated with the microprocessor;
    a column multiplexer connected to each sensor in the columns of sensors;
    a row multiplexer connected to each sensor in the rows of sensors; and
    a sensor signal measurement unit for processing the sensing signals received from the sensors and passing the results to the microprocessor.

4. The device for detecting foreign objects near a primary coil of an induction charger of claim 3, wherein the column multiplexer comprises:
    a gate coupled to each respective column, wherein when the microprocessor selects a column, it sends an enabling signal to enable the gate for that column, to couple the column to a reference potential.

5. The device for detecting foreign objects near a primary coil of an induction charger of claim 3, wherein the row multiplexer comprises:
    a gate coupled to each respective row, wherein when the microprocessor selects a row, it sends an enabling signal to enable the gate for that row, to couple the row to the sensor signal measurement unit.

6. The device for detecting foreign objects near a primary coil of an induction charger of claim 3, wherein a signal derived from the sensor signal induced in the sensor by the alternating magnetic field of the primary coil, is measured by the measurement unit and the measured value sent to the microprocessor to determine whether there is a foreign object present.

7. The device for detecting foreign objects near a primary coil of an induction charger of claim 3, wherein measurements by the sensor signal measurement unit can be stored in the memory as a pattern of the magnetic field produced by the primary coil and used by the microprocessor as a self-calibration baseline for foreign object detection.

8. The device for detecting foreign objects near a primary coil of an induction charger of claim 7, wherein the pattern of the magnetic field produced by the primary coil is significantly altered by the perturbance in that magnetic field caused by a foreign object near the primary coil of the induction charger.

9. The device for detecting foreign objects near a primary coil of an induction charger of claim 8, wherein the significantly altered pattern is compared with the stored baseline pattern to determine the presence of a foreign object near the primary coil.

10. The device for detecting foreign objects near a primary coil of an induction charger of claim 3, wherein the sensor has a first terminal connected to a row line coupled to the row multiplexer, and a second terminal connected to a column line coupled to the column multiplexer.

11. The device for detecting foreign objects near a primary coil of an induction charger of claim 3, wherein the sensor has a first terminal connected to a row line coupled to the row multiplexer, and a second terminal connected to a column line coupled to the column multiplexer, a diode being connected in series between the sensor and one of the row line or the column line.

12. The device for detecting foreign objects near a primary coil of an induction charger of claim 3, wherein the sensor has a first terminal connected to a row line coupled to the row multiplexer, and a second terminal connected to a column line coupled to the column multiplexer, a diode being connected in series between the sensor and one of the row line or the column line, the diode being reverse biased to block coupling to the sensor signal measurement unit when the sensor is not selected by the microprocessor, and the diode being forward biased to couple to the sensor signal measurement unit when the sensor coil is selected by the microprocessor.

13. The device for detecting foreign objects near a primary coil of an induction charger of claim 3, wherein the sensor is a magnetodiode connected in series with a row line and a column line, the magnetodiode being reverse biased to block coupling to the sensor signal measurement unit when the sensor is not selected by the microprocessor and the magnetodiode being forward biased to couple to the sensor signal measurement unit when the sensor is selected by the microprocessor.

14. The device for detecting foreign objects near a primary coil of an induction charger of claim 1, further comprising:
an alarm signal line coupled from the controller to an alarm unit, configured to announce an alarm when the controller determines from the scanned sensor signals, that there is a scanned sensor signal indicating presence of a foreign object.

15. The device for detecting foreign objects near a primary coil of an induction charger of claim 1, wherein the sensors are drawn from the group consisting of printed circuit coils, Hall-effect sensors, MEMS sensors incorporating a strain-gauge reading of magnetic force, Giant Magnetoresistive (GMR) sensors, Magneto-optical sensors, magnetotransistors and magnetodiodes.

16. The device for detecting foreign objects near a primary coil of an induction charger of claim 1, wherein connector lines to the rows of sensors are twisted with connector lines to the columns of sensors, to minimize magnetic field coupling of the connector lines by a high frequency alternating magnetic field produced by the primary coil.

17. A method for detecting foreign objects near a primary coil of an induction charger, comprising:
sensing, by each of a plurality of sensors in a sensor array covering at least a portion of the primary coil, a high frequency alternating magnetic field produced by the primary coil, the sensor array arranged in rows of sensors, each row containing sensors arranged in respective columns;

scanning, by a controller coupled to each respective row of the sensor array and each respective column of the sensor array, sensor signals output by the plurality of sensors in the sensor array, in response to the sensors magnetically coupling the high frequency alternating magnetic field produced by the primary coil;

blocking sensors from coupling to the controller when the sensor is not being scanned by the controller, and coupling sensors to the controller when the sensor is being scanned by the controller; and determining, by the controller coupled to the sensor array, whether there is sensor in the sensor array that is outputting a sensor signal indicating presence of a foreign object proximate to the sensor, which is perturbing the high frequency alternating magnetic field near the sensor.

18. The method for detecting foreign objects near a primary coil of an induction charger, of claim 17, further comprising:
sending, by the controller coupled to the sensor array, a disable signal to a control input of a power source of the primary coil, to disable the power source when the controller determines from the scanned sensor signals, that there is a scanned sensor signal indicating presence of a foreign object.

19. The method for detecting foreign objects near a primary coil of an induction charger, of claim 17, further comprising:
sending, by the controller coupled to the sensor array, an alarm signal to an alarm unit, to announce an alarm when the controller determines from the scanned sensor signals, that there is a scanned sensor signal indicating presence of a foreign object.

* * * * *